(No Model.)
A. SANFORD.
Clevis.
No. 237,447. 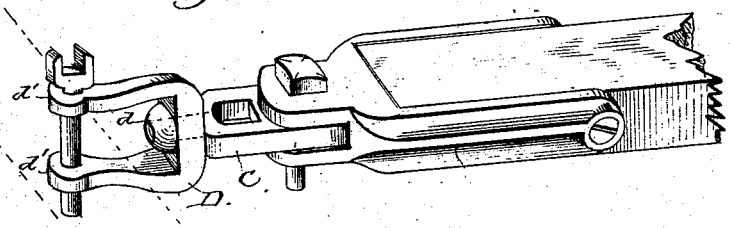 Patented Feb. 8, 1881.
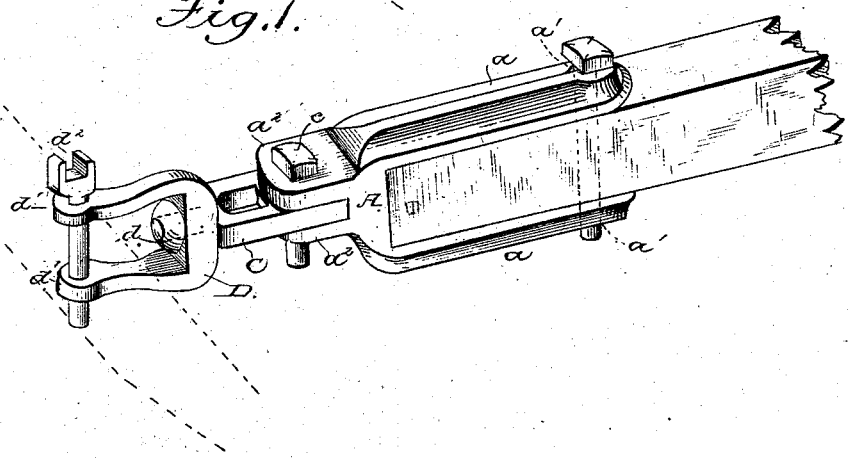
Witnesses:
F. Walter Fowler,
Fred F. Church.
Inventor;
Albert Sanford
By Hill & Church,
His Atty

UNITED STATES PATENT OFFICE.

ALBERT SANFORD, OF OSHKOSH, WISCONSIN.

CLEVIS.

SPECIFICATION forming part of Letters Patent No. 237,447, dated February 8, 1881.

Application filed October 9, 1880. (No model.)

*To all whom it may concern:*

Be it know that I, ALBERT SANFORD, of Oshkosh, in the county of Winnebago and State of Wisconsin, have invented a certain new and useful Improvement in Clevises; and I do hereby declare the following to be a full, clear, and exact description of the same, reference being had to the accompanying drawings, forming part of this specification, in which—

Figures 1 and 2 are views illustrating different forms of the invention.

Similar letters of reference in the several figures denote the same parts.

My invention has for its object to provide improved means for effecting the attachment of horses to plows, harrows, &c., whereby the power of the team is applied most advantageously, and the plow or other object is enabled to be moved vertically and laterally, or turned partly or wholly over, without disturbing the double-tree of the horses. To this end the invention consists in the combination of two clevises and a connecting bar or link, which is swiveled to one clevis and pivoted to and supported by the lugs of the other, as will be hereinafter explained.

In the drawings, Figure 1, A represents a clevis formed with arms $a$ $a$ in the usual manner, having perforations $a'$ $a'$ in their ends for the passage of the bolt, and also formed with lugs $a^2$ $a^2$, which project in planes parallel to the plane of the arms $a$ $a$. These lugs $a^2$ $a^2$ are also perforated, and between them is inserted one end of a bar or link, C, the same being held by a pivotal bolt, $c$, as shown. The other end of bar C is formed into a rounded shank, which, passing through a longitudinal perforation in a second clevis, D, is upset or provided with a nut, $d$, thereby forming a swivel-connection. Clevis D has perforated arms $d'$ $d'$ and is provided with a bolt, $d^2$, as usual. The clevis A is designed to be attached to a plow or harrow by means of a vertical bolt or pivot, and the clevis D is connected to the single or double tree by means of the bolt $d^2$. By placing the bar C between the two clevises the plow or harrow is not only permitted to move horizontally, but, by reason of the swivel-connection, it can be turned on one side or completely over without disturbing the normal position of the double-tree.

The employment of the bar C, by shortening the length of the shank of the device, also lessens the liability of breakage by short turning.

Where the clevis that is secured to the plow is to be held by a horizontal instead of a vertical pivotal bolt, the lugs of said clevis, instead of projecting in planes parallel to the arms, as in Fig. 1, are made to project in planes at right angles to the arms, as shown in Fig. 2.

I claim as my invention—

The combination, with clevises A and D, each having its securing-bolt, of the connecting-bar C pivoted between and supported by the lugs of clevis A and swiveled to clevis D, whereby the plow, harrow, or other object attached to clevis A is enabled to turn laterally or partly or completely over on joints between the securing-bolts of the two clevises, and without disturbing the double-tree attached to clevis D, substantially as described.

ALBERT SANFORD.

Witnesses:
H. B. HARSHAW,
E. C. PORS.